Aug. 3, 1965  A. D. MARASCO  3,199,060
CABLE CONNECTOR ASSEMBLY
Filed Sept. 11, 1962
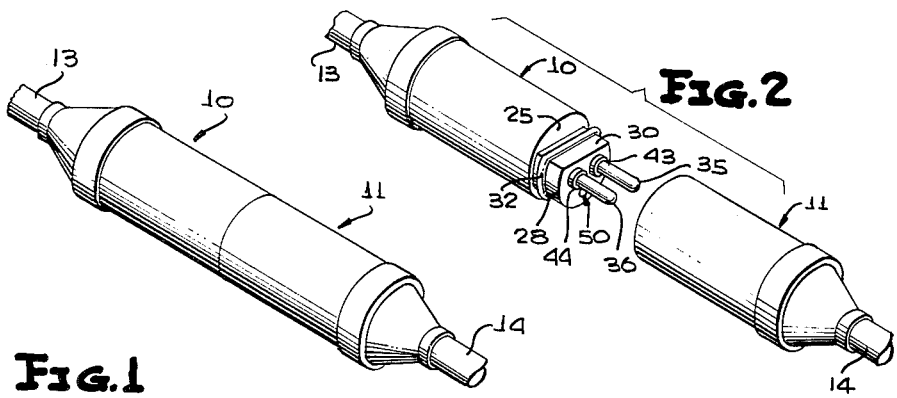
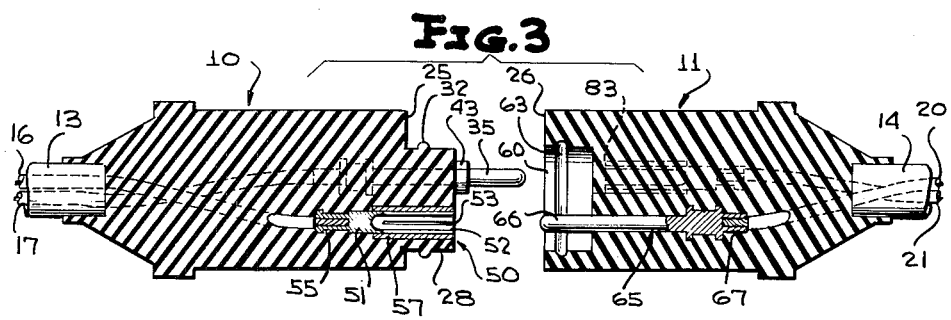
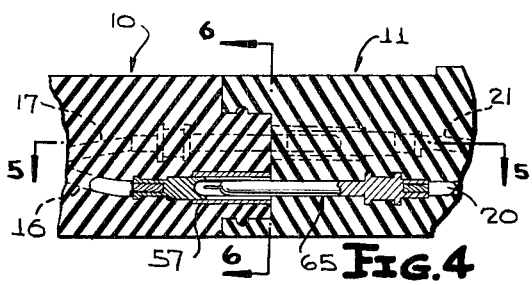
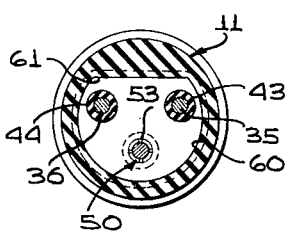
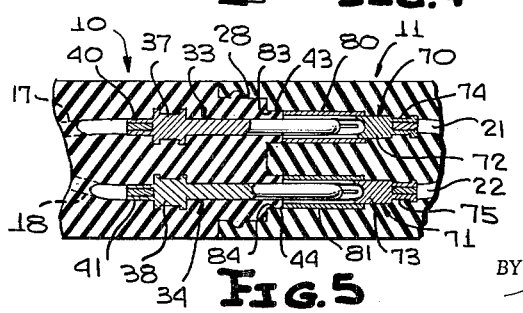
INVENTOR
ANTHONY D. MARASCO
BY Shoemaker and Mattare
ATTORNEYS

United States Patent Office 3,199,060
Patented Aug. 3, 1965

3,199,060
CABLE CONNECTOR ASSEMBLY
Anthony D. Marasco, Norwalk, Conn., assignor to J. B. Nottingham & Co., Inc., New York, N.Y., a corporation of New York
Filed Sept. 11, 1962, Ser. No. 222,816
1 Claim. (Cl. 339—60)

The present invention relates to a new and novel cable connector assembly, and more particularly to an assembly for connecting heavy-duty cables such as utilized in welding systems wherein the cables and connector assembly are subjected to heavy use and rough abusive treatment.

It should also be understood that the cable connector assembly of the present invention may also be readily employed in portable lighting systems or any other type of system wherein it is desired to have a fluid-tight readily connectable and disconnectable electrical connection which is of rugged construction.

In many welding installations, it is necessary to provide different lengths of cable in order to selectively obtain the necessary length of cable to connect the welding equipment with the source of welding current. As a result, welding cables are commonly provided with quick connect and disconnect fittings at the ends thereof which permit different cables to be readily interchanged.

The cable connector assemblies utilized in such applications must, of course, provide a good electrical connection and further must provide a fluid-tight seal in order to prevent damage to the electrical connectors themselves and further to obviate the possibility of hazardous shock conditions.

The present invention accomplishes this desired result by providing an arrangement wherein the electrical coupling means comprises prong-like members which are received within resilient socket-like portions, whereby a good electrical connection is ensured. Additionally, the electrical coupling means is surrounded by complementary nonconductive body portions which are adapted to fit together in such a manner as to ensure that a fluid-tight seal is obtained. This is accomplished by providing firstly end surfaces on the complementary body means which contact one another. In addition, one of the body means is provided with a peripheral rib extending completely therearound which fits within a complementary peripheral groove formed within a recess in the other body means so as to provide a secondary seal. Furthermore, certain of said prong-like electrical coupling members are provided with cylindrical insulating portions which fit within suitable recesses in the other body means for providing a third seal thereby positively ensuring that moisture will not come into contact with such electrical coupling means.

In order to assure that the electrical coupling means of the two complementary body means are not improperly aligned so as to reverse the polarity the two body means are provided with cooperating flats which engage one another and ensure that the two body means can only be connected to one another in one relatively angular position whereat the electrical coupling means are properly aligned.

The cooperating flat portions formed on the two body means also serve to resist any relative rotation between the two body means. This is important in order to prevent twisting loads from being transmitted through the electrical coupling means which would tend to loosen up the electrical contact between such coupling means and further which might tend to damage and bend the electrical coupling means itself.

Since welding cables are very often twisted and thrown about during normal utilization thereof, considerable twisting loads may be applied to the ends of the cables and the complementary flat portions on the body means at the ends of the cables will serve to transmit such turning forces without placing undue stress and strain on the electrical coupling elements.

This engagement of the flats on the body means ensures that there will be no relative rotation between the two body means and thereby ensuring that a more effective fluid-tight seal will also be obtained. The flat formed on one of the body means is adjacent to a recess in the end portion of the body means and serves to reinforce the wall of the body means adjacent this recess to thereby resist the tendency of the wall to be deformed or crushed should it be subjected to a substantial load thereon as may often occur due to trucks or other vehicles inadvertently driving over the cable connector assembly.

An object of the present invention is to provide a new and novel cable connector assembly which provides a good electrical connection and an effective fluid-tight seal between cooperating cable ends.

Another object of the invention is the provision of a cable connector assembly which ensures proper alignment of the end portions of cooperating cables so that there is no possibility of reversing the polarity of the electrical connections.

A further object of the invention is to provide a cable connector assembly wherein the body means is provided wtih means for resisting relative rotation between the ends of the cables.

A still further object of the invention is to provide a cable connector assembly including means for reinforcing a wall of one of the body means to resist crushing or deformation thereof.

Still another object of the invention is to provide a cable connector assembly which is quite simple and inexpensive in construction and yet quite sturdy and reliable in operation.

Other objects and many attendant advantages of the invention will become more apparent when considered in connection with the specification and accompanying drawings, wherein:

FIG. 1 is a perspective view illustrating a pair of cable ends in assembled relationship;

FIG. 2 is a perspective view of the cable ends as shown in FIG. 1 in a disconnected relationship;

FIG. 3 is a vertical section through the cable connector assembly shown in FIG. 2;

FIG. 4 is a vertical section similar to FIG. 3 showing the cable connector assembly in operative engaged relationship;

FIG. 5 is a sectional view taken substantially along line 5—5 of FIG. 4 looking in the direction of the arrows; and FIG. 6 is a sectional view taken substantially along line 6—6 of FIG. 4 looking in the direction of the arrows.

Referring now to the drawings wherein like reference characters designate corresponding parts throughout the several views, the cable connector assembly includes a first substantially cylindrical body means indicated generally by reference numeral 10, and a second substantially cylindrical body means indicated generally by reference numeral 11, these body means being molded about the outer terminal ends of conventional welding cables or the like indicated by reference numerals 13 and 14 respectively.

Each of cables 13 and 14 is provided with three conductors in a conventional manner, these conductors being respectively connected with the plus and minus terminals and ground as is well known.

As seen in FIGS. 4 and 5, the three conductors of cable 13 which are molded into body means 10 are indicated by reference numerals 16, 17 and 18. The three conductors of cable 14 which are molded within body means 11 are indicated by reference numerals 20, 21 and 22.

Body means 10 is provided with an end face 25 which in the assembled relationship of the two body means is adapted to abut against the end face 26 formed on the end of body means 11.

Body means 10 is provided with a longitudinally extending projecting portion 28 which as seen most clearly in FIG. 2 is provided with a flat 30 at one side thereof.

It will be noted that the flat is of substantial extent and in the example shown wherein the projection 28 is of substantially circular cross-section, flat 30 may subtend an arc of approximately 90°. An outwardly projecting peripherally extending rib 32 is formed completely around projecting portion 28 and the flat 30, and this projecting rib portion may have a substantially semicircular cross-sectional configuration.

Referring particularly to FIG. 5, a first pair of electrical coupling means indicated generally by 33 and 34 are embedded within body means 10, these electrical coupling means comprising elongated substantially cylindrical portions 35 and 36 which extend longitudinally outwardly beyond the end of projecting portion 28, these elongated portions joining the enlarged portions 37 and 38 which in turn terminate in thimble portions 40 and 41 which are deformable so as to be crimped upon the bared ends of conductors 17 and 18 as illustrated. A pair of cylindrical portions of insulating material 43 and 44 extend longitudinally outwardly of projecting portion 28 in surrounding relationship to the elongated portions 35 and 36 of coupling means 33 and 34, respectively.

An additional electrical connector means 50 is embedded within body means 10, and comprises a first elongated body of electrically conductive material 51 having a cavity 52 formed in the end thereof, the wall of member 51 being provided with a plurality of longitudinally extending slots 53 which for example may be four in number to provide an inherent resiliency to this portion of the coupling means which receives an elongated coupling means of another complementary body means. Body portion 51 is provided with a thimble portion 55 which is deformable so as to be crimped upon the bared end of conductor 16 as indicated.

The outermost portion of member 51 having the slots 53 therein is surrounded by a substantially cylindrical sleeve member 57 which serves to reinforce the coupling means, to limit the outward springing of the resilient end portion thereof upon the insertion of a complementary coupling member, and further to prevent the slots 53 from becoming filled with the material of the surrounding body means 10 during the molding procedure when the assembly is manufactured.

Referring particularly to FIGS. 3 and 6, body means 11 is provided with a recessed portion 60 in the end surface 26 thereof, this recessed portion having a flat 61 formed along one side thereof, this flat being of the same extent as the flat 30 formed on the other body means 10 and being adapted to fit flush up against the flat 30 when the body means are in assembled relationship. It will be understood that the remaining portion of recess 60 snugly receives the remaining portion of projecting portion 28 on the other body means.

Recessed portion 60 is provided with a groove 63 which extends completely peripherally therearound, the groove, of course, being formed in the flat portion 61 as well as the remaining wall portion of the recessed portion. Groove 63 may be of substantially semicircular cross-sectional configuration and is adapted to snugly receive rib 32 formed on the other body means when the two body means are in assembled relationship.

An electrical coupling means indicated generally by reference numeral 65 is embedded within body means 11, electrical coupling means 65 being substantially identical with the coupling means 33 and 34 previously described, the outer end portion 66 of this coupling means extending within recessed portion 60 and coupling means 65 also being provided with a deformable portion 67 which is adapted to be crimped upon the bared end of conductor 20.

Also embedded within body means 11 are a pair of electrical coupling means 70 and 71 which are identical in configuration with the coupling means 50 previously described. Coupling means 70 and 71 each include electrically conductive portions 72 and 73 respectively which are provided with thimble portions 74 and 75 at the outer ends thereof which are deformable so as to be crimped upon the bared ends of conductors 21 and 22 respectively. The forward ends of members 72 and 73 are provided with recesses for receiving the outer ends of portions 35 and 36 of the coupling means of the other body means, these recesses being surrounded by wall portions having longitudinally extending slots therein for providing the desired degree of resiliency thereto as previously discussed. Substantially cylindrical sleeves 80 and 81 are disposed in surrounding relationship to the outer end portions of members 72 and 73 for the same purpose as sleeve 57 previously described.

The body means 11 is also recessed as indicated by reference numerals 83 and 84, these recessed portions being disposed between the outermost ends of coupling means 70, 71 and the recessed portion 60 previously described.

Recessed portions 83 and 84 are adapted to snugly receive the cylindrical portions 43 and 44 of insulating material surrounding portions 35 and 36 of the coupling means of body means 10 as can be most clearly seen in FIG. 5.

It is apparent that when the cable ends are disposed adjacent one another as shown in FIG. 2, it is merely necessary to align the flat portions on the two body means and then to force the two body means together, whereby the cooperating electrical coupling means of the two body means will be inserted within one another as seen in FIGS. 4 and 5, the two end faces 25 and 26 of the body means thereby being forced into abutting relationship with rib 32 seated within groove 63 and with the longitudinally projecting portions 43 and 44 seated within the cavities 83 and 84.

It is apparent that this arrangement will provide a good electrical connection and a very effective fluid-tight seal which will positively ensure that undesired moisture will not enter into the electrical connection and further that there will be no leakage of electrical current to the exterior of the device. The flat portions formed on the two complementary body means ensure proper alignment of the electrical coupling means and effectively resist relative rotation between the body means even when the cables are subjected to severe twisting forces. Additionally, it is apparent from an inspection of FIG. 6 that the flat portion provided in the wall of body means 11 serves to reinforce this relatively narrow wall portion so as to resist deformation or crushing of this wall portion in this particular area.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by this claim.

I claim:

A cable connector assembly for connecting heavy-duty cables such as used in welding systems and the like comprising first and second body means formed of resilient electrical insulating material, first and second conventional cable portions, said first body means being molded about the terminal end of said first cable portion, said second body means being molded about the terminal end of said second cable portion, each of said cables having three conductors therein, the three conductors of each of said cables extending therefrom and being molded within the associated body means, said first body means including an integral projecting portion of reduced non-circular cross sectional dimension extending longitudinally from the center part of one end portion thereof and extending longitudinally beyond all remaining portions of said first body means, an outwardly extending rib means of substantially semi-circular cross sectional configuration being formed completely around the periphery of said projecting portion and being spaced a substantial distance from the outer end of said projecting portion, a first pair of electrical coupling means being embedded within said body means, each of said first pair of electrical coupling means being electrically connected with one of the conductors embedded within the associated body means, each of said first pair of electrical coupling means extending longitudinally outwardly beyond the end of said projecting portion, and being surrounded for a portion of the extent thereof beyond said projecting portion by a portion of electrical insulating material integral with said projecting portion, an additional electrical coupling means being embedded within said first body means and comprising an elongated body of electrically conductive material having a cavity formed therein and opening through the end face of said projecting portion, the wall of said elongated body being provided with a plurality of longitudinally extending slots to provide inherent resiliency thereto, a substantially cylindrical sleeve member being disposed in surrounding engaging relationship to said elongated body, said second body means including a recessed portion complementary to said projecting portion formed in one end portion thereof for snugly receiving the projecting portion of said first body means, said second body means having a groove formed therein complementary to said rib on the projecting portion of said first body means, and extending peripherally around and in communication with said recessed portion for snugly receiving said rib, said groove being spaced a substantial distance from the outer end of said second body means, said second body means having embedded therein a pair of electrical coupling means each comprising an elongated body of conductive material having a cavity formed therein opening into said recessed portion for receiving said first pair of electrical coupling means embedded within said first body means, the wall of each of said bodies embedded in said second body means being provided with a plurality of longitudinally extending slots to provide inherent resiliency thereto, a substantially cylindrical sleeve member being disposed in surrounding engaging relationship to each of said bodies embedded in said second body means, said second body means being provided with further recessed portions intermediate said first recessed portion thereof and each of the embedded hollow resilient electrical coupling means, said further recessed portions receiving the longitudinally extending electrical insulating portions surrounding said first pair of electrical coupling means embedded in said first body means, and a further electrical coupling means embedded within said second body means and comprising an elongated substantially cylindrical portion extending within said first mentioned recessed portion of said second body means and being received snugly within said resilient hollow electrical coupling means embedded within said first body means.

References Cited by the Examiner

UNITED STATES PATENTS

| | | | |
|---|---|---|---|
| 1,952,188 | 3/34 | Watts | 339—59 |
| 2,396,872 | 3/46 | Miller et al. | 339—103 |
| 2,616,942 | 11/52 | Simpson | 339—62 |
| 2,787,770 | 4/57 | Arson | 339—63 |
| 2,812,506 | 11/57 | Merrill | 339—60 |
| 2,906,986 | 9/59 | Schaefer | 339—60 |
| 2,973,501 | 2/61 | Mapelsden et al. | 339—59 |
| 3,124,405 | 3/64 | Massa | 339—60 |

FOREIGN PATENTS

| | | |
|---|---|---|
| 1,242,876 | 8/60 | France. |
| 800,037 | 8/58 | Great Britain. |

JOSEPH D. SEERS, *Primary Examiner.*